United States Patent

Igawa

[11] Patent Number: 5,308,109
[45] Date of Patent: May 3, 1994

[54] AIR BAG DEVICE FOR A PASSENGER
[75] Inventor: Tadahiro Igawa, Hikone, Japan
[73] Assignee: Takata Corporation, Tokyo, Japan
[21] Appl. No.: 977,103
[22] Filed: Nov. 16, 1992

[30] Foreign Application Priority Data

Dec. 5, 1991 [JP] Japan .................................. 3-321856

[51] Int. Cl.5 ............................................. B60R 21/16
[52] U.S. Cl. ............................. 280/728 R; 280/728 A
[58] Field of Search ........... 280/728 A, 728 B, 728 R, 280/743 R

[56] References Cited

U.S. PATENT DOCUMENTS 3,791,667  2/1974  Haviland .
4,842,300  6/1989  Ziomek et al. .
5,069,480  12/1991  Good .
5,209,519  5/1993  Shiga et al. .......................... 280/728

FOREIGN PATENT DOCUMENTS 0447030  9/1991  European Pat. Off. .
2625960  7/1989  France .
2669875  6/1992  France .
2236082  3/1991  United Kingdom .

Primary Examiner—Brian L. Johnson
Assistant Examiner—Paul Dickson
Attorney, Agent, or Firm—Kanesaka & Takeuchi

[57] ABSTRACT

An air bag device for a passenger comprises a box-shaped container having a front surface defined as an opening for an air bag expansion, an air bag folded and contained in the container in which the edge of a gas inlet is secured to the container, and a gas generator secured to the rear face of a retaining box opposing to the opening. The container comprises a forward half having the opening and a backward half having the gas generator. A rear edge of the forward half and the front edge of the backward half are faced each other and secured by bolts. An edge of the air bag is put between the rear edge of the forward half and the front edge of the backward half and secured to the container. The bag has a stitch portion protruding near the end thereof.

7 Claims, 5 Drawing Sheets

AIR BAG DEVICE FOR A PASSENGER

FIELD OF THE INVENTION

The present invention relates to an air bag device for a passenger and, more in particular, it relates to an air bag device with an improved joining structure between an air bag and a container.

DESCRIPTION OF THE RELATED ART

An air bag device for a passenger is used for protecting an occupant sitting on a passenger's seat of a vehicle from impact shock upon collision of a vehicle or the like. As is well-known, the air bag device is constituted such that a gas is rapidly jetted out from a gas generator when a large acceleration is applied to a vehicle upon collision or the like, and the air bag is extended by the gas.

Description will now be made to an air bag device of prior art with reference to FIGS. 2 and 4.

FIG. 2 is a vertical cross sectional view of an air bag device in the prior art, FIG. 3 is an enlarged view for a portion III in FIG. 2, and FIG. 4 is a cross sectional view taken along lines IV—IV in FIG. 2. FIG. 2 shows a state in which an air bag 10 is extended.

The air bag 10 is folded and contained in a box-shaped container 12 before extension. A front face of the container 12 defines an opening 14 through which the air bag 10 passes upon extending into a vehicle chamber, and the air bag 10 is secured at a base end thereof to a circumferential edge of the opening of the container 12 by means of bolts 18 and nuts 20. A gas generator 22 is attached to a rear wall of the container 12 opposite to the opening 14.

In the illustrated prior art, the rear wall of the container 12 is curved in an arcuate shape toward inside to define a generator retaining portion 24, and the cylindrical gas generator 22 is fit to the generator retaining portion 24. Then, a substantially bisected cylindrical shape retainer 26 covers the back of the container 12 is secured to the rear wall of the container 12 by means of bolts 28 and nuts 30, and the gas generator 22 is disposed securely between the retainer 26 and the generator retaining portion 24.

The gas generator 22 has a cylindrical casing 32 in which a chemical substance capable of rapidly generating gas is charged, and jetting ports 34 are disposed to the casing 32 for jetting out the gas into the container 12. The generator retaining portion 24 has openings 36 disposed at a position aligned with the jetting ports 34. As shown in FIG. 3, a metal seal tape 38 is appended to the casing 32 so as to close the first gas jetting port 34. The seal tape 38 is ruptured when the generator 22 is actuated to jet out the gas and communicates the gas jetting port 34 with the opening 36.

A plurality of suction holes 40 are perforated to an upper wall and a lower wall of the container 12, respectively. When the gas is jetted out passing through the first gas jetting port 34 and the opening 36 into the container 12 to extend the air bag 10, atmospheric air passes through the suction holes 40 and flows into the container 12 so that the air bag 10 is extended rapidly.

By the way, another container 42 (not illustrated) may sometimes be connected ahead of the container 12 with a module cover being disposed to the container 42. The module cover opens to inside of a vehicle chamber when an air bag is extended, to allow the air bag to extend into the vehicle chamber.

In such a tandem type container, connection between the containers 12, 42 is made separate from connection between the container and the air bag. Therefore, it is troblesome to assemble the air bag device.

OBJECT AND SUMMARY OF THE INVENTION

An object of the present invention is to provide an air bag device for a passenger which is easy to assemble and in which an air bag is firmly attached to a container.

An air bag device for a passenger in accordance with the present invention comprises a box-shaped container having a front surface with an opening for air bag expansion, an air bag folded and contained in the container and secured at an edge of a gas inlet to the container, and a gas generator secured to a rear of the container opposite to the opening. The container comprises a forward section having the opening and a rearward section having the gas generator. A rear edge of the forward section and a forward edge of the rearward section are aligned and secured each other by means of a securing member. An edge of the air bag is put between the rear edge of the forward section and the forward edge of the rearward section and secured to the container. The air bag has a ridged stitch portion near the end thereof.

In the air bag device according to the present invention, since the edge of the air bag is put between the forward section and the rearward section, the air bag can be secured to the container together with connecting the forward section with the rearward section.

PREFERRED EMBODIMENTS

FIG. 1 and FIGS. 5 through 8 are, respectively, cross sectional views showing a part of an air bag device for a passenger in each of the embodiments according to the present invention. In each of the embodiments, a container 48 comprises a forward section 44 and rearward section 46. A gas generator 22 is disposed to the rearward section 46.

Figure 1:
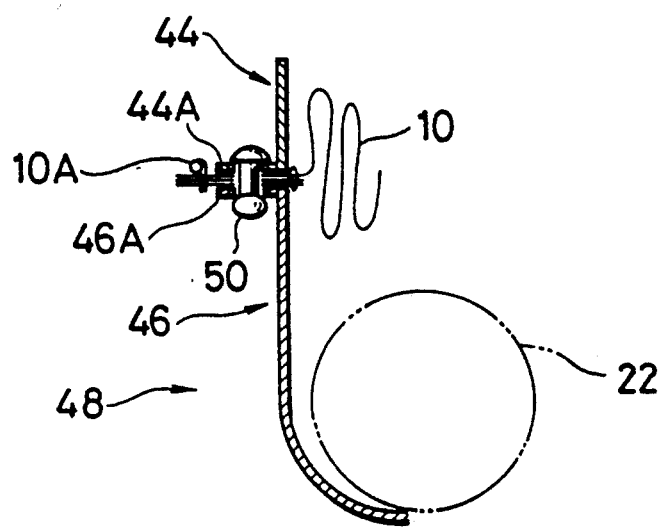
FIG. 1 is a cross sectional view for a portion of an air bag device for a passenger in one embodiment according to the present invention.
Figure 2:
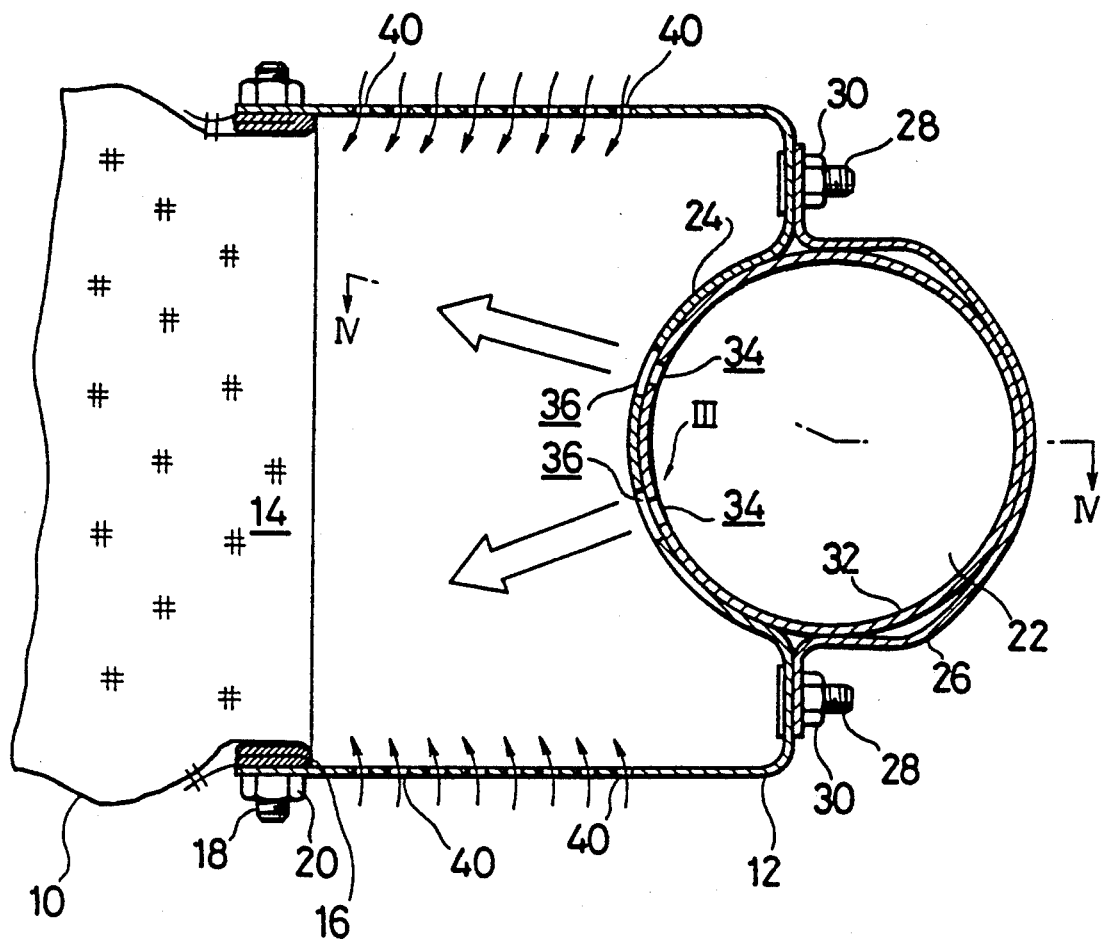
FIG. 2 is a cross sectional view of an air bag device for a passenger in the prior art.
Figure 3:
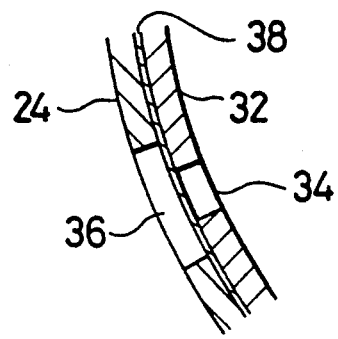
FIG. 3 is an enlarged view for the portion III in FIG. 2.
Figure 4:
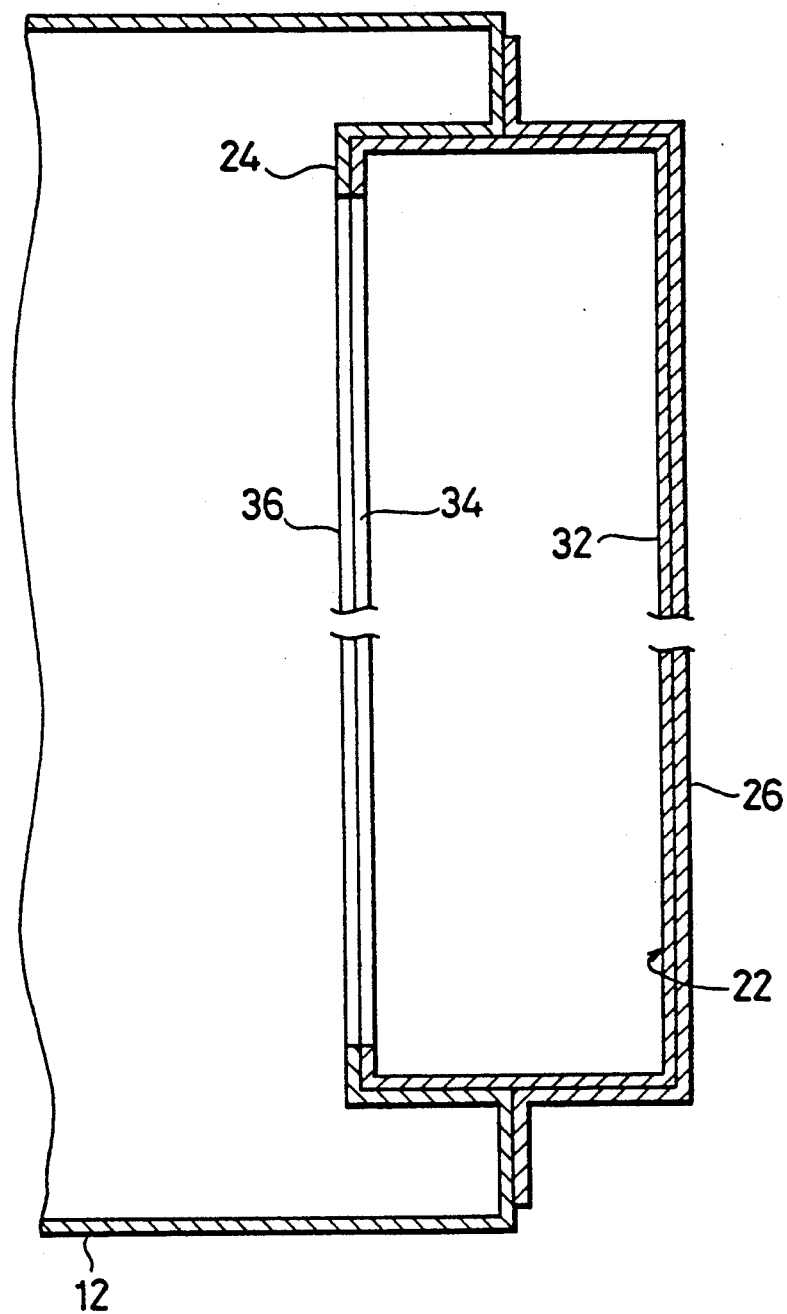
FIG. 4 is a cross sectional view taken along line IV—IV in FIG. 2.

In the embodiment shown in FIG. 1, the container 48 comprises the forward section 44 and the rearward section 46. The forward section 44 and the rearward section 46 have outward flanges 44A and 46A respectively, and the flanges 44A and 46A are overlaid and connected by means of a rivet 50. An edge of the air bag 10 is put between and secured to the flanges 44A and 46A. A stitch portion 10A protruding from a cloth surface of the air bag 10 is disposed near the end of the edge of the air bag. The stitch portion 10A may be composed of thread stitches or of a turned back end of the air bag cloth which is stitched to each other. Further, a cloth different from the air bag 10 may be laid over the bag and stitched to it.

Figure 5:
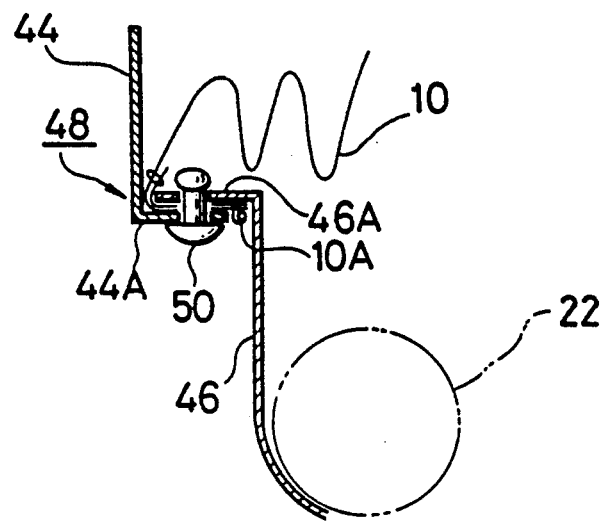
FIG. 5 is a cross sectional view for a portion of an air bag device for a passenger in the embodiment according to the present invention.

In the embodiment shown in FIG. 5, a flange 44A extends inwardly.

Figure 6:
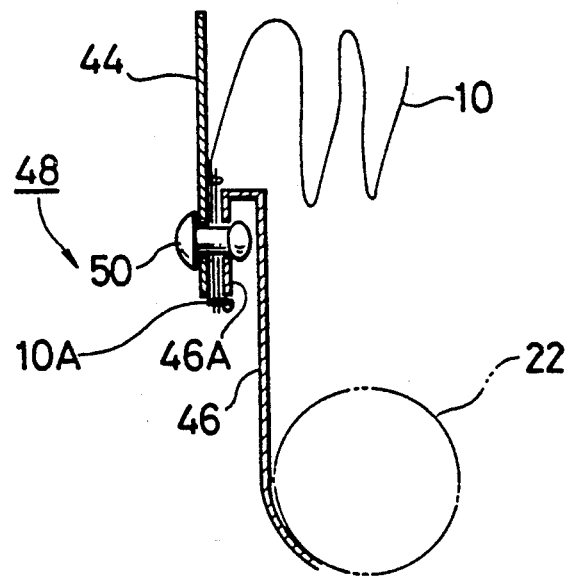
FIG. 6 is a cross sectional view for a portion of an air bag device for a passenger in another embodiment according to the present invention.
Figure 7:
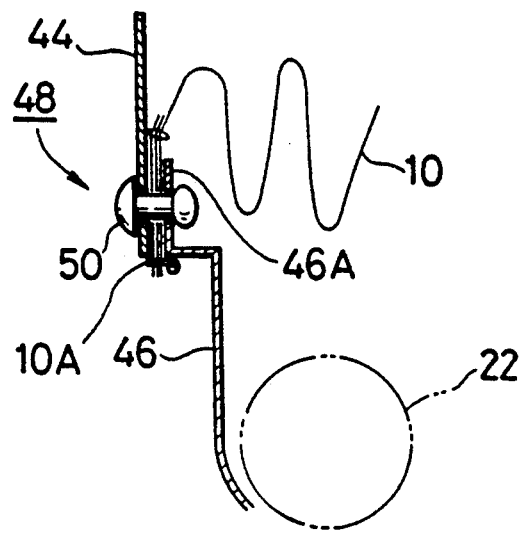
FIG. 7 is a cross sectional view for a portion of an air bag device for a passenger in a further embodiment according to the present invention.

In the embodiment shown in FIG. 6, a flange 46A is disposed in an inverted L-shaped configuration, while in the embodiment shown in FIG. 7, the flange 46A is disposed in an L-shaped configuration. Then, a rear edge of the forward section 44 is overlaid to the outer surface of the flange 46A and connected by a rivet 50.

Figure 8:
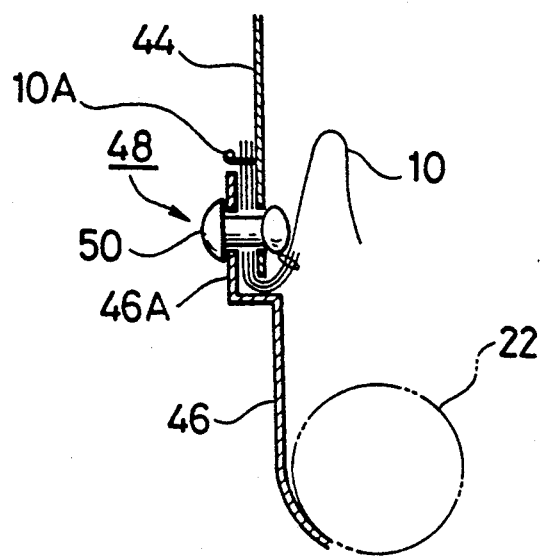
FIG. 8 is a cross sectional view for a portion of an air bag device for a passenger in a still further embodiment according to the present invention.

In the embodiment shown in FIG. 8, a rear edge of the forward section is overlaid to the inner surface of an flange 46A shaped and then connected by means of a rivet 50.

Also in FIGS. 5-8, the edge of the air bag 10 is put between the overlaid portions of the forward section 44 and the rearward section 46 and then secured. Identical reference numerals in FIGS. 5 to 8 show identical members or portions in FIG. 1.

In the structure of the embodiments shown in FIG. 1 and FIGS. 5 to 8, a plate 16, bolts 18 and nuts 20 exclusively used for securing the air bag in the prior art are no more necessary. Then, the air bag 10 can be secured simultaneously when the forward section 44 and the rearward section 46 are connected upon assembling the container 48. Accordingly, the number of parts can be reduced and assembling operation can be facilitated for the entire air bag device.

The rivet 50 is used in the above-mentioned embodiment but other fixing metals or bolts and nuts may also be used.

As has been described above in the air bag device for use in the assistant driver's seat according to the present invention, securing the air bag and assembling the container can be conducted simultaneously and the number of parts can be reduced and the assembling operation can be facilitated for the entire air bag device. Further, the stitch portion can prevent slip off of the air bag.

What is claimed is:

1. An air bag device for a passenger comprising:
   a box-shaped container including a forward section having a front opening for air bag extension and a rear edge to surround the forward section, and a rearward section having a forward edge to surround the rearward section, said forward edge being joined to the rear edge of the forward section to form the container;
   a gas generator secured to the rearward section of the container on a side opposite to the opening,
   an air bag folded and contained in the container and having a hem composed of at least two layers of cloth joined together with an outer line of stitches provided near an end of the air bag to protrude from a surface of the air bag, said hem being placed between the rear and forward edges of the forward and rearward sections so that the outer line of protruded stitches is exposed to atmosphere and disposed outside and not between the rear and forward edges of the forward and rearward sections; and
   securing means passed through the rear edge of the forward section, the hem, and the forward edge of the rearward section to join them together so that when the air bag is expanded, the protruded stitches engage outside of the rear and forward edges of the forward and rearward sections to thereby prevent slip off of the air bag.

2. An air bag device as defined in claim 1, wherein said hem further includes an inner line of stitches to join the layers of the cloth, said inner line of stitches being arranged parallel to the outer line and located outside the rear and forward edges.

3. An air bag device as defined in claim 2, wherein the rear edge of the forward section and the forward edge of the rearward section are provided with a flange, respectively, such that the flanges face toward each other, and a portion of the hem between the inner and outer lines of stitches is placed between the flanges.

4. An air bag as defined in claim 3, further comprising a strip of another cloth laid over and joined to the hem of the air bag with the inner and outer lines of stitches and disposed between the rear and forward edges of the forward and rearward sections, with the outer line of stitches exposed to atmosphere and disposed outside the rear and forward edges of the forward and rearward sections to thereby prevent slip off of the air bag upon air bag extension.

5. An air bag device as defined in claim 3 wherein each of the flanges protrudes outwardly from a side of the container.

6. An air bag device as claimed in claim 3, wherein the flange of the forward section extends inwardly from a rear end thereof, and the flange of the rearward section extends outwardly from a front end thereof.

7. An air bag device as defined in claim 1, wherein the forward edge of the rearward section has a shape turned back into a U-shaped configuration.

* * * * *